US006643287B1

(12) United States Patent
Callon et al.

(10) Patent No.: US 6,643,287 B1
(45) Date of Patent: Nov. 4, 2003

(54) APPARATUS AND METHOD FOR FORWARDING ENCAPSULATED DATA PACKETS ON A NETWORK HAVING MULTIPLE LINKS BETWEEN NODES

(75) Inventors: Ross W. Callon, Westford, MA (US); John K. Renwick, Minneapolis, MN (US)

(73) Assignee: Pluris, Inc., Cupertino, CA (US)

( * ) Notice: Subject to any disclaimer, the term of this patent is extended or adjusted under 35 U.S.C. 154(b) by 0 days.

(21) Appl. No.: 09/444,921

(22) Filed: Nov. 24, 1999

(51) Int. Cl.$^7$ ............................................... H04L 12/56
(52) U.S. Cl. ....................................... 370/392; 370/400
(58) Field of Search ................................. 370/389, 392, 370/393, 400, 401, 402, 403, 409

(56) References Cited

U.S. PATENT DOCUMENTS

| | | | | |
|---|---|---|---|---|
| 5,937,162 A | * | 8/1999 | Funk et al. .................. | 370/401 |
| 6,041,054 A | * | 3/2000 | Westberg ..................... | 370/389 |
| 6,044,080 A | * | 3/2000 | Antonov ...................... | 709/245 |
| 6,119,171 A | * | 9/2000 | Alkhatib ...................... | 370/252 |
| 6,366,563 B1 | * | 4/2002 | Weldon et al. ............... | 370/389 |
| 6,438,127 B1 | * | 8/2002 | Le Goff et al. .............. | 370/393 |
| 6,473,426 B1 | * | 10/2002 | Killian ......................... | 370/393 |
| 6,587,431 B1 | * | 7/2003 | Almulhem et al. .......... | 370/229 |

FOREIGN PATENT DOCUMENTS

| | | | | |
|---|---|---|---|---|
| EP | 0 889 624 A1 | 1/1999 | ........... | H04L/29/06 |
| EP | 0 910 195 A2 | 4/1999 | ........... | H04L/12/46 |

OTHER PUBLICATIONS

Giacometti, Stefano, et al., "Tunnelling Effectiveness in the Access Environment," Utrecht, NL, Aug. 24–28, 1999, London: IBTE, GB, Aug. 24, 1999, pp. 101–105.

* cited by examiner

Primary Examiner—Melvin Marcelo
Assistant Examiner—Nhat Do
(74) Attorney, Agent, or Firm—Donald R. Boys; Central Coast Patent Agency, Inc.

(57) ABSTRACT

An apparatus and method for encapsulating and forwarding packets on a network are disclosed. The network can include a first subnetwork such as a virtual private network connected to a larger public network such as the Internet. An encapsulating header is attached to a packet to be transferred across the public network from a source node on the private network to a destination node on the private network, such that the packet can be transferred across the public network. The encapsulating header includes a value which is derived from the private header on the packet used to transfer the packet along the private network. The value is therefore associated with a source/destination pair within the private network. The value can be derived by performing a hash operation on the private network header. After the public network header containing the value derived from the private network header is attached to the packet, it can be forwarded across the public network. A logical operation such as a hash operation can be performed on the public network header to select one of a plurality of possible paths on the public network to forward the packet. As a result, each source/destination pair within the private network will be associated with a path within the public network. Traffic from the private network can therefore be distributed over multiple paths in the public network, thus reducing or eliminating traffic congestion and overload.

37 Claims, 6 Drawing Sheets

Use of Multipath in a Datagram IP network

Multi-link case

APPARATUS AND METHOD FOR FORWARDING ENCAPSULATED DATA PACKETS ON A NETWORK HAVING MULTIPLE LINKS BETWEEN NODES

FIELD OF THE INVENTION

The present invention is related to techniques for forwarding data packets on networks and is more particularly related to a technique for forwarding encapsulated data packets on a network in which network nodes are in general connected by multiple parallel links.

BACKGROUND OF THE INVENTION

In digital computer networks such as the Internet, collections of data, referred to as "datagrams," are typically transferred from node to node over the network in packets. Each packet of data typically includes a header portion and a data portion. In accordance with the common Internet protocol (IP), the header portion typically includes a 32-bit source identifying portion which identifies the source node that originated the packet and a 32-bit destination identifying portion which identifies the destination node to which the packet is ultimately to be transferred.

At each node, a router is used to forward the packet to the next node in the path toward the destination node. When a router receives a packet, it examines the destination address in the packet header. It then searches its locally stored routing table to determine the next node to which the packet should be transferred in order to ensure that it will reach its destination, typically along the shortest possible path. The router then forwards the packet to the next node identified in the routing table. This process continues at each successive node until the destination node is reached.

In many cases, in such a datagram IP network, when forwarding an IP packet, there are situations in which there are two or more choices for the next step or "hop" that the packet can take. FIG. 1 contains a schematic block diagram of a conventional IP packet forwarding network 10. The network 10 includes multiple nodes 12 connected by links 13. Referring to FIG. 1, the case in which IP packets are forwarded from node A to node F, for example, is considered. In this situation, node A will forward the packet to node B. Node B will then have a choice; it can forward the packet via either node C or node D.

In general, multiple hosts 14 are coupled to each node A and F. A host 14 coupled to node A may have a sequence of multiple IP packets destined for another host 14 attached to node F. It is desirable to keep the packets associated with any one host-to-host flow in order. This is important to improve the efficiency of communication. For example, in many cases, the hosts 14 may be running Internet applications over the Transmission Control Protocol (TCP), and TCP may make use of "slow start." When applications are making use of TCP slow start, if packets are delivered out of order, the TCP implementation assumes that the misordering of packets is caused by congestion in the network. In response, the rate of traffic transmitted may be reduced. If in fact there is no congestion in the network, then this will result in less efficient use of the network.

Typically, IP routers solve this problem by choosing between multiple equal-cost choices for the next hop for a particular packet. The router typically performs an analysis of the packet header contents to assign each packet to a link. Usually, this involves a hash function of the five-tuple of fields in the IP header (source IP address, destination IP address, protocol, source port number, destination port number) or a subset of these fields, such as source IP address and destination IP address. A hash function is designed to perform a computation on one or more data words and return a unique data word of shorter length. For example, a hash function performed on two 32-bit IP addresses may divide the combined 64-bit word by a constant and return as a result the value of the reminder in fewer bits, e.g., five. Other hash procedures include the use of a cyclic redundancy check (CRC) and/or the use of a checksum.

Each time a hash procedure is performed on the same initial values, the same result is obtained. This ensures that packets associated with any one source/destination pair always take the same path, while simultaneously allowing different packets to take different paths. As noted above, sometimes additional fields may be used for the hash. It is noted that any packets belonging to the same flow of packets, i.e., packets which should be kept in order, will also contain the same protocol field in the IP header. Packets which contain a different value in the protocol field may therefore be safely transmitted on a different path. Similiarly, if the protocol field indicates that the next higher level protocol is TCP, then packets which contain different TCP port numbers can be routed on different paths. For these reasons, it is common for the hash to also take account of the protocol and port fields.

Thus, referring to FIG. 1, in general, multiple hosts 14 attached to node A send IP packets to multiple hosts 14 attached to router F. Under the technique described above, packets from any one source/destination pair will always be transmitted over the same path, i.e., via either router C or router D. However, the packets averaged over all of the source/destination pairs will be split, with some being sent via node C and some being sent via node D. This allows more efficient loading of the network 10 by splitting traffic among multiple available paths.

As the demand for data network services increases, it is becoming increasingly common for the interconnection between any two nodes to include multiple parallel links. Using multiple links increases the total bandwidth available for data transmission. Also, using multiple links allows for the possibility that if one link fails, there will still be a path through the network between any two nodes.

FIG. 2 is a schematic block diagram of a network 100 which includes multiple links 113 between nodes 112. Specifically, the nodes B, C, D and E in the core of the network 100 are shown interconnected using two links 113 rather than a single link.

In this case, the same technique as described above for forwarding packets can be used. In particular, node B can perform a hash on the IP source and destination addresses. In this case, node B has four choices for possible links to use in forwarding a packet toward node F. Node B can therefore use a hash function with four possible output values. Each of the four links is considered a possible choice for the next hop. In this case, as in the previous case, packets for any single source/destination pair will always go via the same link, i.e., via either one of the two links to C or one of the two links to D. However, the packets averaged over all of the source/destination pairs will be split, with some being sent via each of the four links. This allows for more efficient loading of the network by splitting traffic among multiple available links in addition to multiple available paths.

Traffic engineering refers to the issue of distributing traffic throughout a network to ensure efficient use of network resources. Typically, this implies making choices of paths used by traffic to make careful and intentional tradeoffs between taking the minimum distance path and using lightly loaded links. There are two main issues to be considered in traffic engineering. First, it should be determined which set of paths are available between any ingress node $n_i$ and egress node $n_e$ in the network. Also, for any particular packet between ingress node $n_i$ and egress node $n_e$, it should be determined which of the available paths to take.

Traffic engineering methods can be divided into two classes: connection-oriented methods and connectionless methods. Connection-oriented methods make use of some sort of connection set-up to determine which path is used between the ingress node $n_i$ and the egress node $n_e$. Connectionless methods make use of some other method to determine which path is used between the ingress node $n_i$ and the egress node $n_e$, such as, for example, adjusting the metrics assigned to each link as used in the route computation.

Where connection-oriented methods are used for traffic engineering, it is determined at the ingress node which of several paths is to be used to a particular egress node. Where connectionless methods are used, each node along the path from the ingress node to the egress node may need to determine which next hop to use for a particular packet. In each case, the determination is typically done by performing a hash on IP source and destination fields. The hash may also contain other fields such as the protocol field in the IP header and/or the port field in the TCP header, if present.

Using traffic engineering, it may also be necessary to adjust the amount of traffic sent on each of several available paths. This can be done by adjusting the hash function. One common approach is to use a hash function which produces a large number of possible results, e.g., 256, 512 or 1,024 possible values. The hash result is used as an input to a large table. The table specifies the next hop link or the connection to be used. Typically, each possible link or connection may occur in the table multiple times. Adjusting the amount of traffic sent on each path is done by changing the frequency with which each link or connection occurs in the table.

Thus, it is often very important to manipulate the distribution of traffic over the routes and paths on a network, without having to rely on the assumption that an even statistical distribution will always result. Under the study of traffic engineering, various techniques for performing this manipulation have been developed.

One area in which traffic engineering becomes difficult is in the case of virtual private networks (VPNs). In general, VPNs exist in multiple geographic locations. Interconnection of these locations may be done by using public Internet IP service. However, private networks may make use of non-standard protocols and addresses. For example, the addresses used inside a private network may reuse the same address values used in parts of the public Internet. Similarly, multiple different private networks may reuse the same address values. It is not possible to simply transmit the private IP packets over the public Internet, because the use of non-standard addresses will cause the addresses of the packets to be confused. To solve this problem, the private network packets are typically encapsulated inside IP packets with standard IP source and destination addresses for transmission over the public Internet.

Using this form of encapsulation, packets associated with any particular VPN have a single pair of IP source and destination addresses. The result is that the hash function discussed above will always return the same value for any one VPN. This implies that all packets from a single VPN will always take the same path. That is, this approach does not allow packets from a single VPN to be spread among multiple paths through the communications network. This is particularly unfortunate for very large VPNs. For example, in some cases, a core Internet service provider (ISP) may carry traffic on behalf of another large ISP and may make use of encapsulated IP-in-IP tunnels to carry this traffic while keeping the traffic separate from other traffic. Similarly, very large companies such as automobile or computer manufacturers will have very large private networks. In these cases, the amount of traffic associated with a single VPN may be very large. It may therefore be undesirable to require that this traffic take a single path through the public Internet. Also, in some cases, the amount of traffic associated with a single VPN exceeds the capacity of one or more links internal to an ISP. In these cases, requiring that the traffic all take a single path through the ISP may make it impossible to carry the VPN traffic through that ISP.

SUMMARY OF THE INVENTION

The present invention provides a technique for distributing traffic over plural paths such that traffic congestion and overloading problems in prior systems are substantially reduced. The invention is directed to an apparatus and method for transferring a packet of data on a network. The network in general includes a first subnetwork, which can be a virtual private network (VPN), and a second subnetwork, which can be a portion of the public Internet. The invention is directed to the situation in which a packet of data is being transferred from a source node on the first subnetwork to a destination node on the first subnetwork and the first subnetwork is connected to the second subnetwork such that the packet of data is transferred across the second subnetwork between the source and destination nodes. The packet of data includes a private or first header portion which is associated with the source and destination nodes on the first subnetwork. A value is derived from the first header portion such that the value is also associated with the source and destination nodes on the first subnetwork. A second header portion is coupled to the packet of data to enable the packet to be transferred across the second subnetwork. This second header portion is generated to include the value that was derived from the first header portion. One of a plurality of paths within the second subnetwork is selected using the second header portion that was added to the packet.

In accordance with the invention, the packet being transferred is encapsulated such that it can be forwarded over the second subnetwork, e.g., the public Internet, by adding the second header portion, e.g., an IP header, to the packet. Because the value included in the second header portion is derived from the first header portion, any specific source/destination pair within the first subnetwork, i.e., the virtual private network, will result in a unique header for the second header portion. Therefore, in accordance with the invention, the encapsulating second header portion can be used to uniquely select one of a plurality of possible paths on the second subnetwork for transfer of the packet. In one embodiment, a logical operation such as a hash operation is performed on the second header portion. The result of the hash operation is then used to select one of the plurality of paths. In this way, traffic from the first subnetwork, e.g., the VPN, can be distributed over the plurality of paths. At the same time, packets within a flow, i.e., packets associated with a single source/destination pair, always take the same path such that misordering of packets is eliminated.

In one embodiment, the technique of the invention is used to transfer packets across the public Internet. Therefore, packets are encapsulated in accordance with the IP protocol. Accordingly, the encapsulating second header portion is compatible with the IP protocol. That is, it is an IP header.

The invention is applicable to various forms of encapsulation. For example, Ethernet-in-IP encapsulation involves transferring packets from and to a VPN which uses Ethernet protocol. In that case, the first header portion, i.e., the private network header, is a Ethernet header. Where the VPN incorporates IP packet transfer, then IP-in-IP encapsulation is used. In this case, both the first header portion and the second header portion are IP headers.

In one embodiment, the value that is provided within the second header portion is derived by performing a logical operation such as a hash operation on the first header portion. The hash operation can be performed on information in the first header portion that is related to addresses of the source and destination nodes on the first (private) subnetwork between which the packet is being transferred. In one particular embodiment, the source and destination information is related to IP source and destination addresses of the source and destination nodes, respectively. The hash operation therefore uniquely identifies a source/destination pair such that the value can be used to select a single path to be associated with that source/destination pair. The hash operation can also be performed on a protocol field within the first header portion. The hash operation used to derive the value can include one of several techniques. For example, a division can be performed on the first header portion. The value can then be derived from the resulting remainder generated by the division. Alternatively, the hash operation can include a cyclic redundancy check (CRC). Alternatively, the hash operation can include a checksum operation.

As mentioned above, when forwarding the encapsulated packet over the public network, in order to select one of the plurality of paths to be associated with the packet, a hash operation can be performed on the second header portion attached to the packet. The hash operation performed in this case can also be one of the techniques mentioned above. Alternatively, other hash operations can be used.

The technique of the invention allows for improved control over levels of traffic on networks, and, in particular, the Internet. The present invention allows individual source/destination pairs within subnetworks or private networks on the larger public network to be distinguished and, therefore, uniquely associated with a path for transmission of data. As a result, traffic within a private network which is carried over the public network can be evenly distributed over multiple paths through the public network. Congestion and link overloading can be reduced or eliminated. In addition, from a traffic engineering standpoint, the invention provides the flexibility to control individual traffic levels on individual paths. That is, traffic on the individual paths can be controlled individually in settings where that level of control is more desirable that an even statistical distribution.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
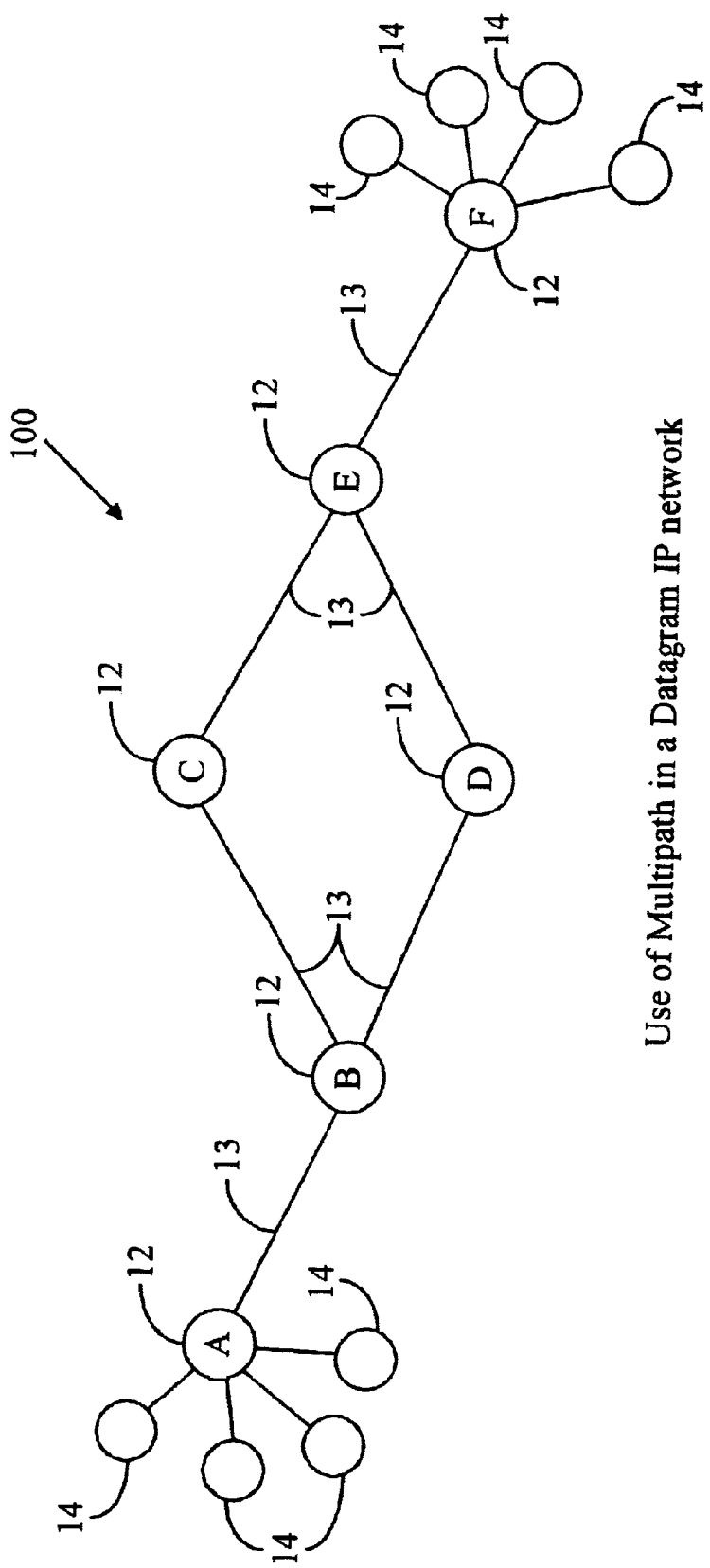
FIG. 1 is a schematic block diagram of a network to which the present invention is applicable.
Figure 2:
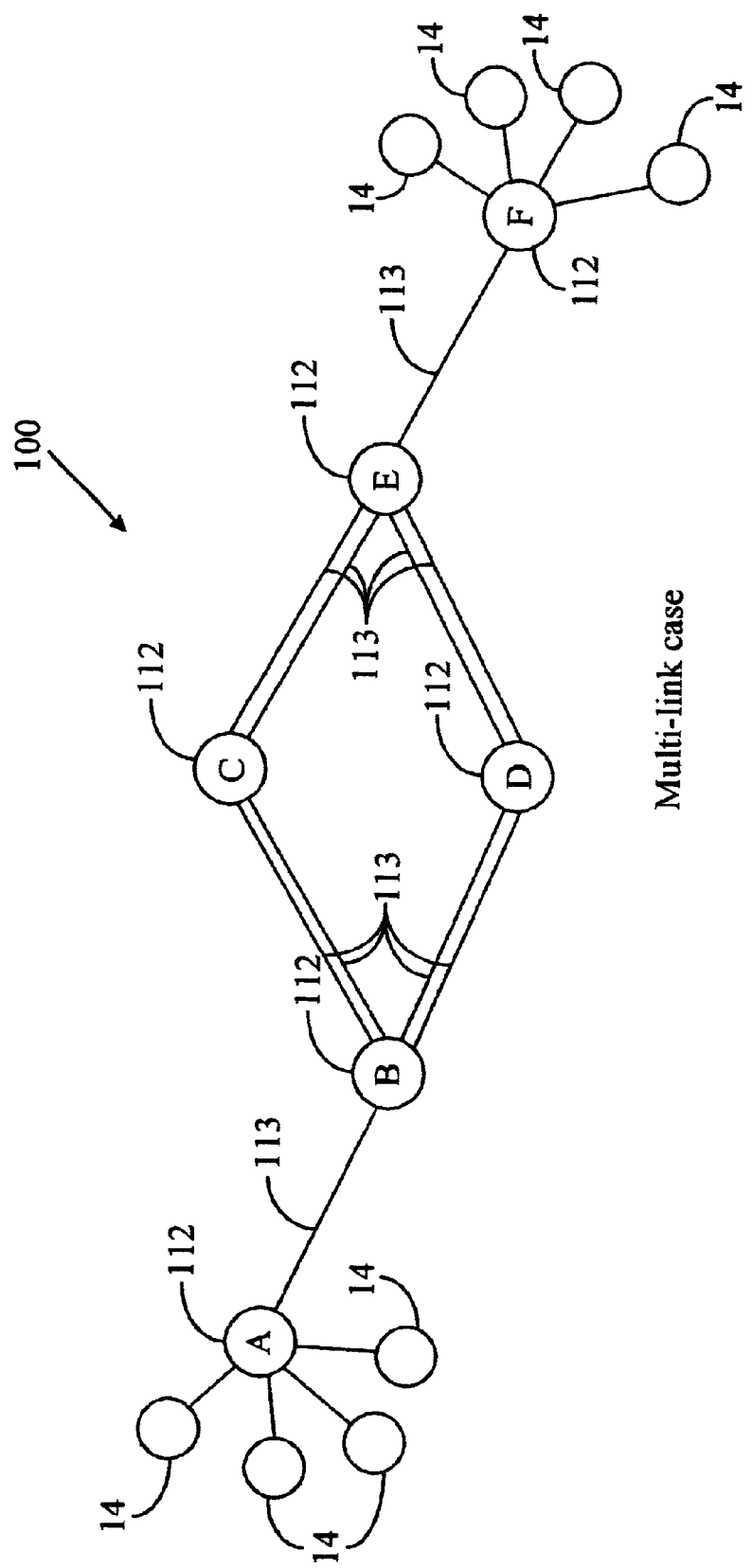
FIG. 2 is a schematic block diagram of a network having plural links between nodes to which the present invention is applicable.
Figure 3:
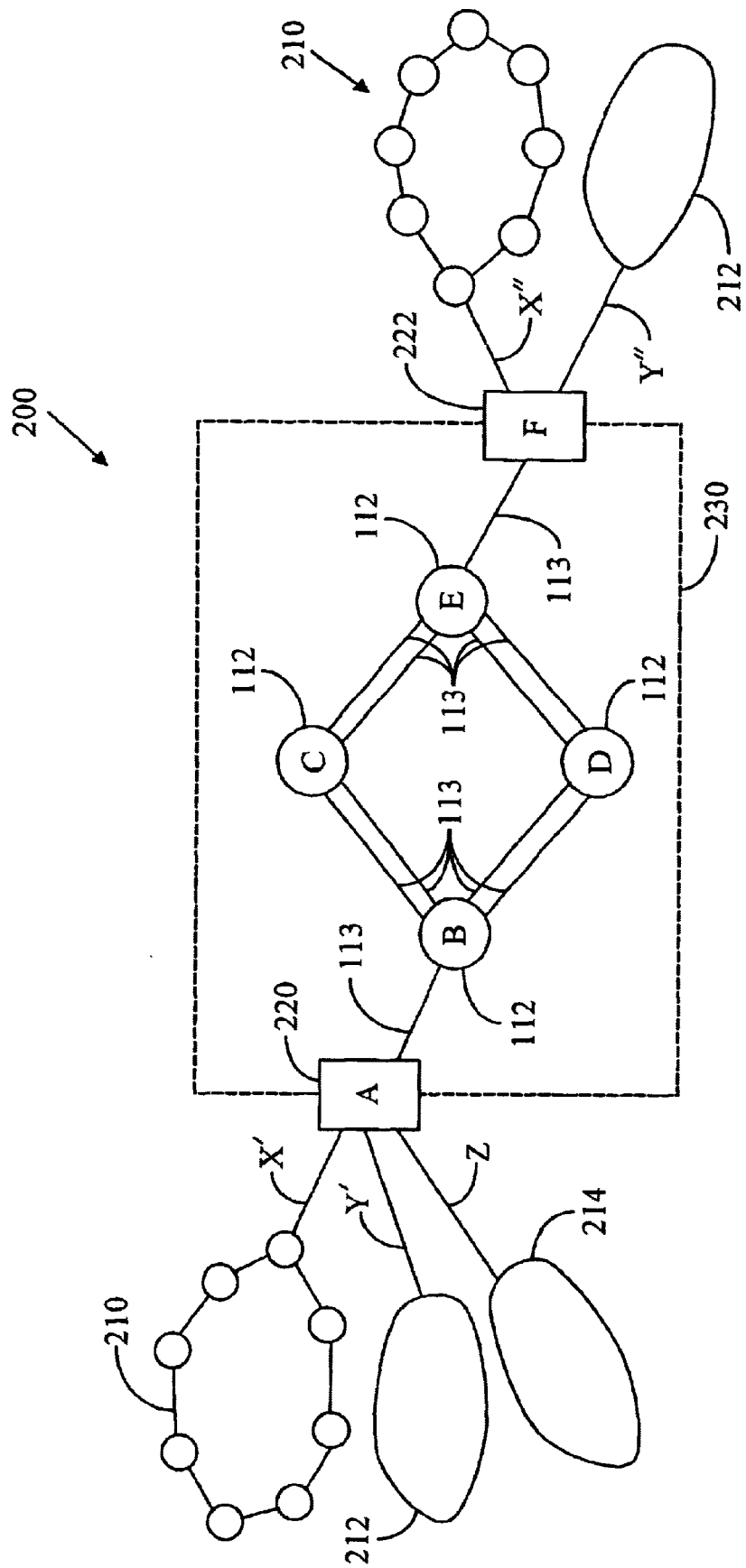
FIG. 3 is a schematic block diagram of a network which includes private networks connected across a public network to which the packet encapsulating and transferring technique of the invention is applicable.

FIG. 3 is a schematic block diagram of a network 200 which includes one or more private networks connected across a public network to which the packet encapsulating and transferring technique of the invention is applicable. The network 200 includes a core public network or subnetwork 230, such as the Internet, coupled via an ingress node A (220) and an egress node F (222) to multiple private networks or subnetworks 210, 212, and 214 referred to herein as networks X, Y, and Z, respectively. In this configuration, nodes A and F are capable of encapsulating packets in IP format. Therefore, in the case where the private networks use IP forwarding, nodes A and F are capable of performing IP-in-IP encapsulation.

In the illustrated configuration, private network X (210) has two sites, which are indicated as X' and X". These sites are interconnected via the public network 230 which includes nodes A, B, C, D, E and F and which forwards packets using IP protocol, for example. Device A encapsulates packets received from X' in an IP packet for transmission over the public network 230 to device F. This encapsulation includes adding an IP header to packets from the private network 210. Device F then decapsulates the packet, i.e., removes the IP header added at node A, and transmits the packet contained therein to the X" portion of the private network 210. It should be noted that in the illustrated example, private network Y is also located at two sites Y' and Y", and packets transferred from Y' to Y" also must be transferred over the public network 230.

When node A encapsulates packets from X' which are destined for X", node A uses a single source address, $Addr_{A,X'}$ which is chosen from the public IP address space to specify the X' private network at node A. A destination address $Addr_{A,X''}$ is chosen to specify the X" private network at node F as the destination. It is noted that node A chooses multiple such addresses, i.e., one for the X network, one for the Y network, one for the Z network, etc. Node A typically has a single address prefix chosen from the public Internet space which is used to form the high-order part of the addresses used to designate VPNs at node A. Similarly, node F has a different single address prefix also chosen from the public Internet space for the high-order part of addresses used to designate VPNs at node F.

Figure 4:
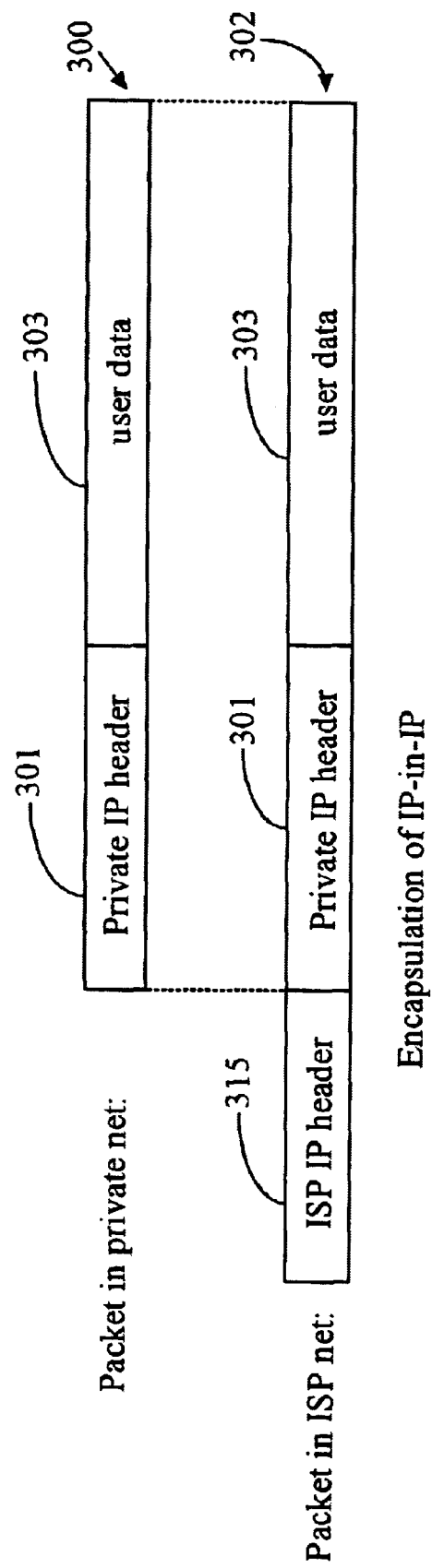
FIG. 4 is a schematic block diagram which illustrates encapsulation of a data packet from a private network for transfer over a public network.

FIG. 4 is a schematic block diagram which illustrates encapsulation of a data packet from a private network for transfer over the public network. In this case, what is illustrated is IP-in-IP encapsulation. The packet 300 as transmitted within the private network, e.g., network X, includes the private IP header 301 plus user data 303. Node A encapsulates the packet 300 by adding an IP header, referred to herein as an Internet service provider (ISP) IP header 305, to generate an encapsulated packet 302 for transmission through the public ISP IP network 230.

Figure 5:
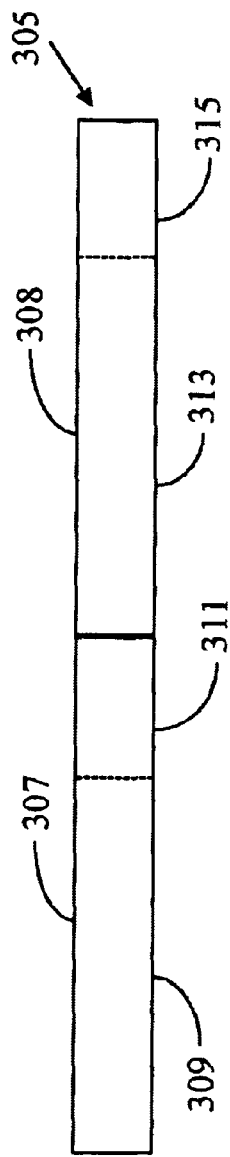
FIG. 5 is a schematic detailed block diagram of the IP header added to the private network packet in FIG. 4 to encapsulate the private network packet.

FIG. 5 is a schematic detailed block diagram of one embodiment of the IP header 305 added to the private network packet 300 to encapsulate the private network packet 300. The header 305 includes a source address portion 307 and a destination address portion 308. A typical IP header 305 includes 32 bits of source address 307 and 32 bits of destination address 308. The high-order portion 309 of the source address may for example be 24 bits long and is used to specify the encapsulating router, in this case, the router at node A. The low-order portion 311 of the source address 307 includes 8 bits and is typically used to specify the VPN, in this case, network X. The destination address 308 also includes a high-order order portion 313 including 24 bits as well as a low-order portion 315 which includes 8 bits. The high-order portion specifies the decapsulating router, in this case, the router at node F, and the low-order portion specifies the VPN, in this case, network X. Thus, in this example, for a packet going from X' to X", the high-order portion 309 of the source address 307 will be the prefix assigned to router A. The high-order portion 313 of the destination address 308 would be the prefix assigned to router F. The low-order portions 311, 315 of both addresses would specify VPN X.

Figure 6:
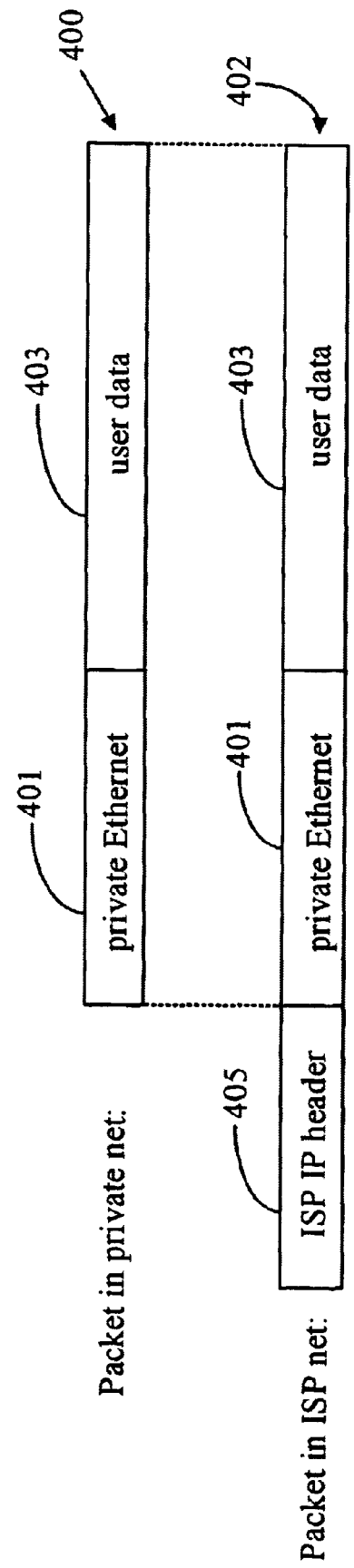
FIG. 6 is a schematic block diagram which illustrates encapsulation of a private Ethernet packet for transmission in IP.

Packets corresponding to other private network protocols may also be encapsulated for transmission over IP networks. For example, Ethernet packets can be encapsulated for transmission. FIG. 6 is a schematic block diagram of encapsulation of a private Ethernet packet 400 for transmission in IP. The private Ethernet packet 400 includes a private Ethernet header portion 401 and user data 403. For transmission over the IP network, the encapsulating router, in this case the router at node A, adds the public ISP IP header 405 to the packet 400 to generate an encapsulated packet 402 for transmission over the IP network. It should be noted that Ethernet packets may themselves contain encapsulated packets such as IP packets, DECnet packets, IPX packets, SNA packets or packets corresponding to any protocol that is capable of running over Ethernet. Similarly, voice traffic may be encapsulated for transmission over IP using standards which have been developed. In general, there are presently many protocols which may be encapsulated in IP for transmission over the Internet.

When encapsulation is performed as described above, the packets associated with any particular VPN have a single pair of IP source and destination addresses. This implies that the hash function discussed above will always return the same value for any one VPN. This in turn implies that all packets from a single VPN will always take the same path. That is, the techniques described above do not allow packets from a single VPN to be spread among multiple paths through the public communications network.

This is a problem for very large VPNs, such as the situation in which one ISP carries traffic on behalf of another large ISP by using encapsulated IP-in-IP tunnels to carry the traffic. Also, large companies may have large VPNs. In these cases, the amount of traffic associated with a single VPN may be very large such that it would be undesirable to require that this traffic all take a single path through the public network. Also, in other cases, the amount of traffic associated with a single VPN may exceed the capacity of the links internal to the public network. In these cases, requiring that all of the traffic take a single path through the public network may make it impossible to carry the VPN traffic through the network.

A solution to this problem in accordance with the invention is to have the routers perform a hash on addresses contained in two different IP headers, namely, the public IP header 305 and the private IP header 301, as shown in FIG. 4. This solution is useful in many situations. There are also situation in which a different solution is preferable. For example, it can be computationally inefficient to require that routers look at two different IP headers. Also, in general, there may be no second IP header, such as in the case illustrated in FIG. 6 in which the encapsulated header is an Ethernet header. Also, routers in the core in the network such as routers B, C, D and E in FIG. 3 might not understand all of the protocols which might be encapsulated inside of IP packets transmitted through the network.

To solve this situation, in accordance with another aspect of the invention, a hash operation is performed on a portion of the encapsulated packet associated with the packet source and destination to generate a value that is also associated with the source and destination. That value is then included in the encapsulating IP header 305, 405. In one embodiment, the hash operation is performed on the source and destination addresses within the encapsulated (private) packet. In another embodiment, the protocol field and/or the port fields can be used in the hash operation. Since the hash is performed on fields which uniquely identify source and destination nodes within the private network, the value generated thereby is unique for any identified source/destination pair. When the routers in the public network operate on the encapsulating header, e.g., by performing a hash operation, each source/destination pair within the private network will produce a unique result. The result can be used to select a path along the public network. As a result, traffic for different source/destination pairs within the private network can be distributed over different paths in the public network. At the same time, all traffic for a single source destination pair will take the same path, ensuring that misordering of packets at the destination is avoided.

The hash operation performed on the private network header can be any of the hash functions mentioned herein. That is, the hash operation can perform a division on the header and retain the remainder as the value. Also, in another embodiment, a cyclic redundancy check (CRC) can be used. Alternatively, a checksum operation can be used.

Figure 7:
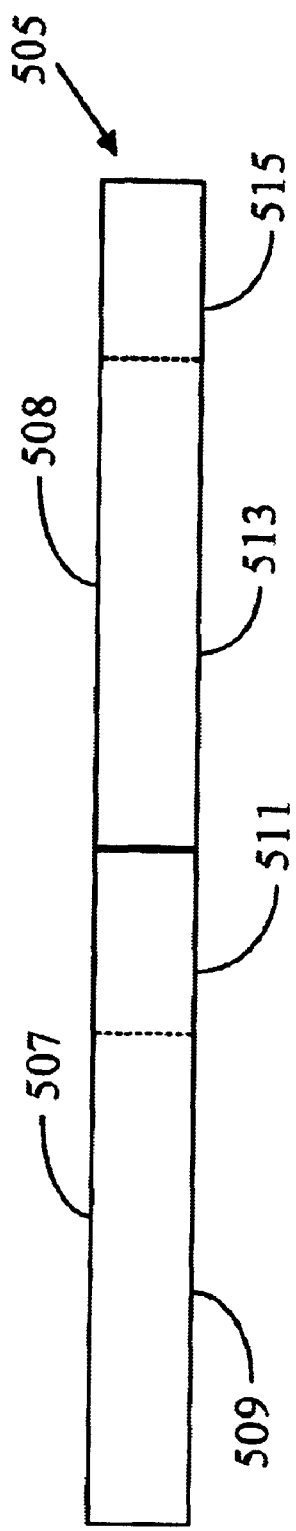
FIG. 7 is a schematic detailed diagram of one embodiment of an encapsulating header used in accordance with one embodiment of the present invention.

In accordance with the invention, instead of encapsulating packets for a particular private network using a single source and destination address pair, a range of addresses is used. This is accomplished by reserving some number of bits within the source and/or destination address fields to contain the hash value on the encapsulated header. FIG. 7 is a schematic detailed diagram of one embodiment of an encapsulating header 505 used in accordance with one embodiment of the present invention. The header 505 includes a source address portion 507 and a destination address portion 508. The source address 507 includes a high-order portion 509 and a low-order portion 511. Likewise, the destination address portion 508 includes a high-order portion 513 and a low-order portion 515. The encapsulating and decapsulating routers, e.g. node A and node F, respectively, have a range of addresses assigned to them for support of encapsulation and decapsulation for VPNs. In one embodiment of the invention, the destination address portion 508 of the encapsulating header 505 can be assigned to specify the VPN as described above in connection with FIG. 5. That is, the high-order portion 513 can include 24 bits which are used to specify the decapsulating router, in this case, the router at node F. The low-order portion 515 of the destination address 508 can include 8 bits used to specify the particular VPN, in this example, private network X. In accordance with the invention, the source address portion 507 of the encapsulating header 505 is used to distinguish the individual nodes on the private network. Specifically, the high-order portion 509 can be used to specify the encapsulating router, in this case, the router at node A. The low-order portion 511 can be used to specify the value generated as a result of the hash operation performed on the encapsulated header. As such, the low-order portion 511 is used to distinguish the source/destination on the private network associated with the packet from other source/destination pairs. That is, the high-order portion 509 of the source address 507 is assigned such that it specifies the address range assigned to the encapsulating router, and the low-order portion 511 consists of the hash to distinguish the individual nodes on the private network.

In accordance with the invention, when the encapsulated private header is an IP header, the hash performed on the IP header is performed on the encapsulated IP source and destination addresses. Optionally, the hash can also be performed on the protocol field and/or the port field. When the invention is applied to other type private headers, the hash can be performed on appropriate fields such as the source and destination addresses contained in the private header.

In another embodiment, the value derived from the hash operation on the encapsulated private header is not stored in the source address portion 507 of the encapsulating header 505. Instead, it can be stored in the protocol field in the encapsulating header 505. This can be implemented with some recognized caveats. For example, the value cannot be included in the protocol field corresponding to TCP or UDP as the next higher level protocol because routers may assume that TCP or UDP is encapsulated directly as the next protocol within the public IP header. This could result in a router incorrectly hashing on a number of bits included where the port field would be if the protocol had been TCP or UDP. However, it is noted that routers used within the core of an ISP typically do not hash on any other higher layer protocol, other than TCP and UDP. This implies that there are 254 possible values out of the 256 possibilities for an 8-bit field which can be used in the protocol field. A hash function can be selected to return any of 254 values with a relatively even distribution. For example, a 16-bit hash can be computed based on either a checksum or a CRC. A module 254 operation is then applied to the hash, resulting in a value in the range of 0–253. Finally, the specific values which are assigned to TCP and UDP are mapped to the numbers 254 and 255, respectively.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for transferring a packet of data on a network, said network including a first subnetwork and a second subnetwork, said packet of data being transferred from a source node on the first subnetwork to a destination node on the first subnetwork, the first subnetwork being connected to the second subnetwork such that the packet of data is transferred across the second subnetwork between the source and destination nodes on the first subnetwork, said packet of data having a first header portion which is associated with the source and destination nodes on the first subnetwork, said method comprising:

generating a value derived from the first header portion such that said value is also associated with the source and destination nodes on the first subnetwork;

providing the packet of data with a second header portion, the second header portion including the value derived from the first header portion; and using the second header portion, selecting one of a plurality of paths on the second subnetwork for forwarding of the packet.

2. The method of claim 1 wherein the first subnetwork is a virtual private network.

3. The method of claim 2 wherein the second subnetwork is a portion of the Internet.

4. The method of claim 1 wherein the second subnetwork is a portion of the Internet.

5. The method of claim 1 wherein the first header portion is an Internet Protocol (IP) packet header.

6. The method of claim 5 wherein the second header portion is an IP packet header.

7. The method of claim 1 wherein the first header portion is an Ethernet packet header.

8. The method of claim 7 wherein the second header portion is an IP packet header.

9. The method of claim 1 wherein the second header portion is an IP packet header.

10. The method of claim 1 wherein the value is derived by performing a hash operation on the first header portion.

11. The method of claim 10 wherein the hash operation is performed on information in the first header portion related to addresses of the source and destination nodes.

12. The method of claim 10 wherein the hash operation is performed on a protocol field in the first header portion.

13. The method of claim 10 wherein the hash operation is performed on IP source and destination addresses of the source and destination nodes, respectively.

14. The method of claim 10 wherein the hash operation comprises performing a division on the first header portion.

15. The method of claim 14 wherein the value is related to a remainder generated by the division.

16. The method of claim 10 wherein the hash operation comprises a cyclic redundancy check.

17. The method of claim 10 wherein the hash operation comprises a checksum operation.

18. The method of claim 1 wherein the selecting step comprises performing a hash operation on the second header portion.

19. An apparatus for transferring a packet of data on a network, said network including a first subnetwork and a second subnetwork, said packet of data being transferred from a source node on the first subnetwork to a destination node on the first subnetwork, the first subnetwork being connected the second subnetwork such that the packet of data is transferred across the second subnetwork between the source and destination nodes on the first subnetwork, said packet of data having a first header portion which is associated with the source and destination nodes on the first subnetwork, said apparatus (i) generates a value derived from the first header portion such that said value is also associated with the source and destination nodes on the first subnetwork, (ii) provides the packet of data with a second header portion, the second header portion including the value derived from the first header portion, and, (iii) uses the second header portion, selecting one of a plurality of paths on the second subnetwork for forwarding of the packet.

20. The apparatus of claim 19 wherein the processing device is located within a network node between the first subnetwork and the second subnetwork.

21. The apparatus of claim 19 wherein the first subnetwork is a virtual private network.

22. The apparatus of claim 21 wherein the second subnetwork is a portion of the Internet.

23. The apparatus of claim 22 wherein the second subnetwork is a portion of the Internet.

24. The apparatus of claim 19 wherein the first header portion is an Internet Protocol (IP) packet header.

25. The apparatus of claim 24 wherein the second header portion is an IP packet header.

26. The apparatus of claim 19 wherein the first header portion is an Ethernet packet header.

27. The apparatus of claim 26 wherein the second header portion is an IP packet header.

28. The apparatus of claim 19 wherein the second header portion is an IP packet header.

29. The method of claim 19 wherein the processing device derives the value by performing a hash operation on the first header portion.

30. The apparatus of claim 29 wherein the hash operation is performed on information in the first header portion related to addresses of the source and destination nodes.

31. The apparatus of claim 29 wherein the hash operation is performed on a protocol field in the first header portion.

32. The apparatus of claim 29 wherein the hash operation is performed on IP source and destination addresses of the source and destination nodes, respectively.

33. The apparatus of claim 29 wherein the hash operation comprises performing a division on the first header portion.

34. The apparatus of claim 33 wherein the value is related to a remainder generated by the division.

35. The apparatus of claim 29 wherein the hash operation comprises a cyclic redundancy check.

36. The apparatus of claim 29 wherein the hash operation comprises a checksum operation.

37. The apparatus of claim 19 wherein, in selecting one of the plurality of paths, the processing device performs a hash operation on a second header portion.

* * * * *